(12) United States Patent  
Oerlemans

(10) Patent No.: US 9,719,488 B2  
(45) Date of Patent: Aug. 1, 2017

(54) ARRANGEMENT TO REDUCE NOISE OF A WIND TURBINE ROTOR BLADE

(71) Applicant: Siemens Aktiengesellschaft, Munich (DE)

(72) Inventor: Stefan Oerlemans, Herning (DK)

(73) Assignee: Siemens Aktiengesellschaft, Munich (DE)

(*) Notice: Subject to any disclaimer, the term of this patent is extended or adjusted under 35 U.S.C. 154(b) by 383 days.

(21) Appl. No.: 14/455,971

(22) Filed: Aug. 11, 2014

(65) Prior Publication Data

US 2015/0078910 A1    Mar. 19, 2015

(30) Foreign Application Priority Data

Sep. 18, 2013  (EP) ..................... 13184966

(51) Int. Cl.  
*F03D 1/06*    (2006.01)

(52) U.S. Cl.  
CPC ......... *F03D 1/0641* (2013.01); *F03D 1/0608* (2013.01); *F03D 1/0675* (2013.01);  
(Continued)

(58) Field of Classification Search  
CPC .... F03D 1/0641; F03D 1/0675; F03D 1/0633; F03D 7/0296  
See application file for complete search history.

(56) References Cited

U.S. PATENT DOCUMENTS 5,088,665 A * 2/1992 Vijgen .................... B64C 23/06  
244/198

7,927,078 B2 * 4/2011 Parsania ............... F03D 1/0675  
416/228

(Continued)

FOREIGN PATENT DOCUMENTS

CA    2719171 A1    2/2010  
EP    1338793 A2    8/2003  
(Continued)

OTHER PUBLICATIONS

Stefan Oerlemans: "Detection of aeroacoustic sound sources on aircraft and wind turbines", http://doc.utwente.nl/67363/1/thesis S Oerlemans.pdf, chapter 8, ISBN 978-90-80-6343-9-8; 2009.

(Continued)

*Primary Examiner* — Kenneth Bomberg  
*Assistant Examiner* — John Hunter  
(74) *Attorney, Agent, or Firm* — Beusse Wolter Sanks & Maire

(57) ABSTRACT

An arrangement to reduce noise of a wind turbine rotor blade is provided, including a wind turbine rotor blade and a noise reduction device. The noise reduction device includes a serrated extension for at least reducing noise generated from the wind turbine rotor blade, the noise reduction device attached to the trailing edge section. The serrated extension has a number of first and second teeth. The designs of the first and second teeth are differently compared to each other such that suction side noise and pressure side noise are both reduced by the teeth of the serrated extension. Advantageously, the first teeth and the second teeth are arranged in an alternating, periodic pattern and differ from each other by an angle of inclination with regard to a trailing edge streamline and or by its planform shape. Furthermore, a method to reduce noise of a wind turbine rotor blade is provided.

14 Claims, 6 Drawing Sheets

(52) U.S. Cl.
CPC ....... *F05B 2240/30* (2013.01); *F05B 2260/96* (2013.01); *Y02E 10/721* (2013.01); *Y10T 29/49318* (2015.01)

(56) References Cited

U.S. PATENT DOCUMENTS

| | | | |
|---|---|---|---|
| 8,162,590 B2* | 4/2012 | Haag | F03D 1/0633 |
| | | | 415/4.3 |
| 8,267,657 B2 | 9/2012 | Davidson | |
| 8,794,927 B2* | 8/2014 | Vassilicos | F15D 1/10 |
| | | | 416/228 |
| 9,581,133 B2* | 2/2017 | Yao | F03D 1/0608 |
| 2009/0074585 A1 | 3/2009 | Fisher | |
| 2011/0142666 A1 | 6/2011 | Fisher | |
| 2011/0268558 A1 | 11/2011 | Lin | |
| 2012/0027590 A1 | 2/2012 | Bonnet | |
| 2012/0134837 A1 | 5/2012 | Frere | |
| 2012/0141277 A1 | 6/2012 | Caruso | |
| 2013/0170999 A1* | 7/2013 | Vassilicos | F15D 1/10 |
| | | | 416/223 R |
| 2014/0227101 A1* | 8/2014 | Yao | F03D 1/0608 |
| | | | 416/236 R |
| 2014/0377077 A1* | 12/2014 | Gruber | F01D 5/141 |
| | | | 416/228 |

FOREIGN PATENT DOCUMENTS

| | | |
|---|---|---|
| WO | 2007140771 A1 | 12/2007 |
| WO | 2012156359 A1 | 11/2012 |

OTHER PUBLICATIONS

J.G. Schepers et al: "SIROCCO: Silent rotors by acoustic optimisation", ftp://ftp.ecn.nl/pub/www/library/report/2007/m07064.pdf; 2007.

* cited by examiner

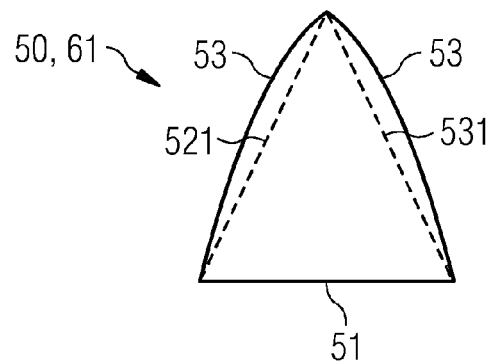
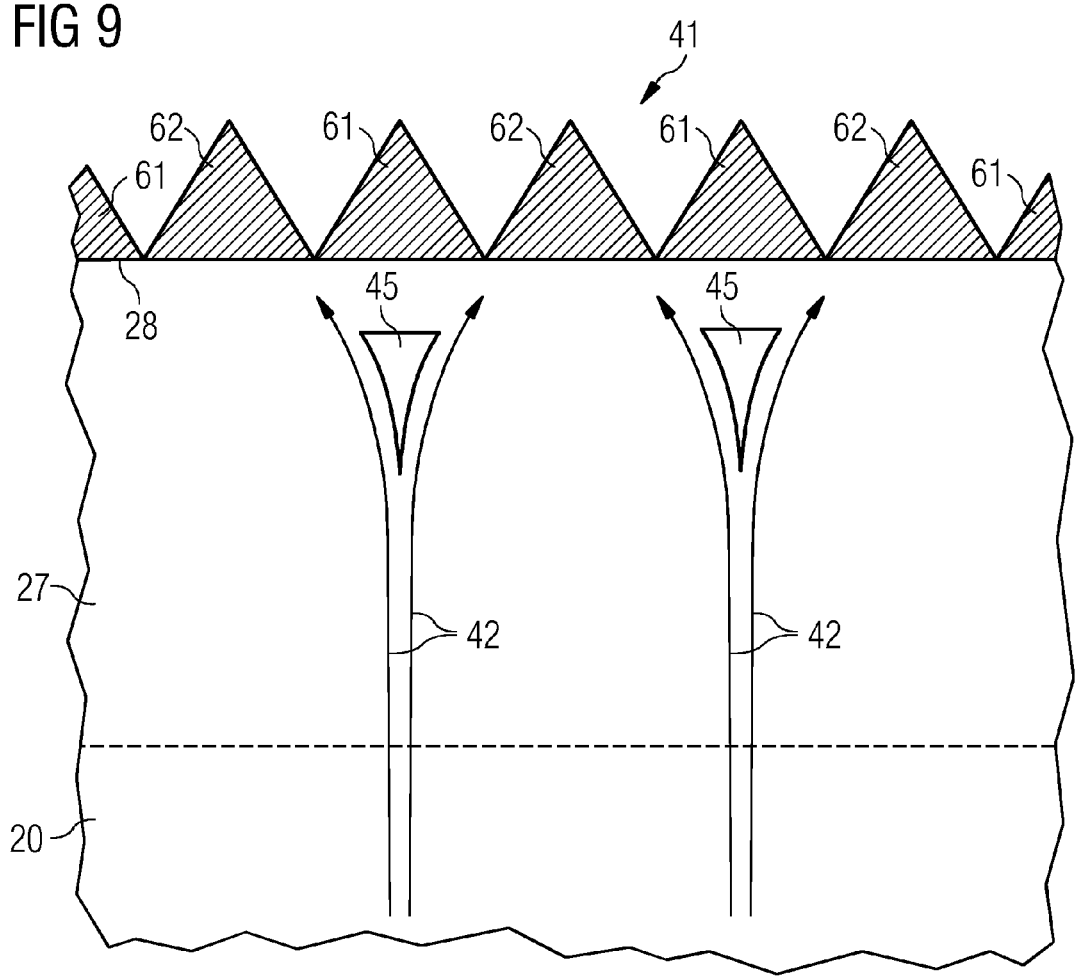

ARRANGEMENT TO REDUCE NOISE OF A WIND TURBINE ROTOR BLADE

CROSS REFERENCE TO RELATED APPLICATIONS

This application claims the benefit of European Application No. EP13184966 filed Sep. 18, 2013, incorporated by reference herein in its entirety.

FIELD OF INVENTION

The present invention relates to an arrangement to reduce noise of a wind turbine rotor blade. In particular, the arrangement comprises a noise reduction device, which is attached to a trailing edge section of the wind turbine rotor blade, and which reduces noise, generated by the wind turbine rotor blade, in an advantageous manner. Furthermore, the invention relates to a method to reduce noise of the wind turbine rotor blade.

BACKGROUND OF THE INVENTION

The level of noise emission is a critical and important design parameter of a wind turbine. In particular, if the wind turbine is located on-shore and close to residential areas, the noise emitted by the wind turbine may be a nuisance and annoyance for the local residents. Thus, considerable effort in research and development has been spent in reducing the noise emission level of wind turbines.

A significant share of noise originating from a wind turbine is generated by wind flowing across a wind turbine rotor blade. More specifically, a significant share of noise originating from the wind turbine rotor blade is generated at the trailing edge section of the wind turbine rotor blade.

One way to reduce noise generated at the trailing edge section of the wind turbine rotor blade is the use of serrated panels which are also denoted as DinoTails. Serrated panels for wind turbine rotor blades are, for instance, disclosed in the European patent application EP 2 309 119 A1. A serrated panel typically has the shape of a panel or plate and comprises serrations, which are also referred to as teeth, on at least one side of the panel. Such a serrated panel is for instance attached to the trailing edge section by an adhesive.

The teeth of a serrated panel are typically optimized regarding their shape and arrangement such that an overall noise emission level of the wind turbine rotor blade is minimized.

The composition of the noise which is generated and emitted by a wind turbine rotor blade is typically complex. On the one hand, the noise is generated or created at different sections or positions of the wind turbine rotor blade. As typically a pressure side and a suction side can be assigned to a wind turbine rotor blade, thus the overall noise can be divided in noise originating from the pressure side and noise originating from the suction side. Furthermore, the frequency spectrum of the generated and emitted noise can be broad. More specifically, the noise generated by a wind turbine rotor blade may comprise frequencies from several hertz up to several kilohertz.

Reducing noise of a wind turbine rotor blade in the whole frequency range by means of conventional serrated panels is only possible up to a certain extent. Thus, there exists the need and desire to provide a noise reduction device to achieve a broadband noise reduction of the wind turbine rotor blade. In particular, it is desired to reduce both noise originating from the pressure side and noise originating from the suction side of the wind turbine rotor blade.

SUMMARY OF THE INVENTION

This objective is achieved by the independent claims. The dependent claims describe advantageous developments and modifications of the invention.

In accordance with aspects of the invention there is provided an arrangement to reduce noise of a wind turbine rotor blade. The arrangement comprises a wind turbine rotor blade and a noise reduction device. The wind turbine rotor blade comprises a root end, a tip end, a leading edge section and a trailing edge section. The noise reduction device comprises a serrated extension for at least reducing noise which is generated from the wind turbine rotor blade. The noise reduction device is attached to the trailing edge section. The serrated extension comprises a number of first teeth and a number of second teeth. The design of the first teeth and the design of the second teeth are differently compared to each other such that suction side noise, which is generated at a suction side of the wind turbine rotor blade, and pressure side noise, which is generated at a pressure side of the wind turbine rotor blade, are both reduced by the teeth of the serrated extension.

An important aspect of the present invention is thus based on the concept or the idea to divide the teeth of the serrated extension into a first group of first teeth and into at least a second group of second teeth, wherein the first teeth specifically addresses a first aspect or first component of the overall noise generated by the wind turbine rotor blade, and the second teeth specifically addresses a second aspect or second component of the noise. An advantage of having the two groups of teeth is that both groups can be optimized regarding their design separately and independently from each other. For instance, the first teeth can specifically be designed to reduce noise generated by the pressure side of the wind turbine rotor blade while the second teeth can specifically be designed to reduce noise generated by the suction side of the wind turbine rotor blade. Alternatively, different groups of teeth can address different frequency ranges of the overall noise. A consequence of the specialized groups of teeth which address different aspects of the overall noise is that the overall noise emission level can be reduced.

It has to be noted that the design of the teeth includes several aspects. First, the design comprises the shape of the teeth. The shape includes all aspects regarding the relative geometrical shape of the teeth. Thus, the teeth may have a shape of a triangle or the shape of a rectangle; they may have edges and rims and/or they may be round and curved; furthermore, the teeth may be elongated, clinched, etc. The design also includes the dimensions of the teeth. In particular, this relates to a longitudinal extension, a transversal extension and a thickness of the teeth. Finally, it is important to be noted that the design of the teeth also comprises how the teeth are arranged with regard to the trailing edge section of the wind turbine rotor blade. For example, the teeth may be aligned with a chord of the wind turbine rotor blade. Alternatively, the teeth may be inclined with regard to the chord.

The serrated extension may be shaped as a conventional serrated panel. In other words, the serrated extension may comprise a plate, wherein at least one side of the plate comprises serrations. This serrated panel may be attached to the trailing edge section of the wind turbine rotor blade. This attachment can be performed during the manufacturing of the wind turbine rotor blade or, alternatively, as a retrofit. A retrofit attachment of the serrated extension to a wind turbine rotor blade refers to an option that the serrated extension is attached to the wind turbine rotor blade, which is already mounted to a hub of the wind turbine. In particular, the retrofit can be performed after the wind turbine was in operation for some time already.

Alternatively, the serrated extension may also be manufactured integrally when manufacturing the wind turbine rotor blade. An advantage of integrating the manufacturing of the serrated extension into the manufacturing of the wind turbine rotor blade is that there is no need to manufacture a separate serrated panel which later has to be attached to the wind turbine rotor blade, as the serrated extension is already a part of the manufactured wind turbine rotor blade.

While in many conventional noise reduction device, in particular in serrated panels with teeth, a noise reduction at low and medium frequencies is accompanied by a noise increase at high frequencies, the serrated extension presented in this invention reduces noise from both the suction side and the pressure side, thus reducing noise in a broad range of frequencies.

The dimensions of the first teeth and the second teeth depend on several parameters such as the size of the wind turbine rotor blade, wind flow speed under which the wind turbine rotor blade is expected to be operated etc. However, in an advantageous embodiment, the spanwise extension and the chordwise extension of a tooth is in a range between 1 cm (centimeter) and 20 cm. Additionally, advantageously, a thickness of the tooth does not exceed 2 cm, in particular does not exceed 1 cm.

In an advantageous embodiment, the trailing edge section comprises a trailing edge, and the first teeth and the second teeth are arranged in a row substantially along the trailing edge.

The trailing edge can also be understood as a rim or a line which is most distal from the leading edge section in a chordwise direction. Under typical operational conditions of a wind turbine, wind flows from the leading edge section along the pressure side and the suction side to the trailing edge section. In other words, the typical wind flow is substantially perpendicular to the trailing edge. It is thus advantageous to place or arrange the first teeth and the second teeth along the trailing edge in order to reduce noise generated by wind flowing over the wind turbine rotor blade in a large spatial region.

It is possible to place the first teeth and the second teeth with spacings between each other. However, advantageously, the first teeth and the second teeth are arranged in a row and directly adjacent to each other along the trailing edge.

In a first alternative, the serrated extension extends along the whole trailing edge. This means that the serrated extension extends from the root end to the tip end of the wind turbine rotor blade.

In a second alternative, however, serrated extensions are only placed in an outboard part of the trailing edge section. It is advantageous to place the serrated extension only in the outboard part as a significant and considerable share of the noise generated by the wind turbine rotor blade is generated at the outboard part of the wind turbine rotor blade.

In another advantageous embodiment, the first teeth and the second teeth are arranged in an alternating, periodic pattern.

Under certain conditions and circumstances, it may be advantageous to arrange the first teeth and the second teeth randomly and/or irregularly. However, in order to minimize the overall noise generated by the wind turbine rotor blade efficiently and reliably, an alternating pattern is advantageous. For instance, each second tooth is a tooth of the first group of first teeth and, likewise, each other second tooth is a tooth of the second group of second teeth. In other words, each first tooth has two neighboring second teeth and each second tooth has two neighboring first teeth. It may, however, also be advantageous that only every third or every fourth tooth is a tooth of the second group of second teeth. In general, it can be said that the serrated extension advantageously comprises first teeth, except every nth-tooth (n=1, 2, 3, . . . ) which is a tooth of the second group of second teeth.

In an advantageous embodiment, a number of first teeth is differing by less than two with regard to a number of second teeth.

In other words, the number of first teeth is basically equal to the number of second teeth. As an example, the serrated extension may comprise 51 teeth of which 25 are first teeth and 26 are second teeth. These 51 teeth are advantageously arranged such that each first tooth is adjacent to two second teeth and the tooth at the first end of the row is a second tooth and the tooth at the second end of the row is a second tooth as well.

In another advantageous embodiment, the first teeth are substantially triangularly shaped.

Although the teeth may in principle have any shape, it is advantageous to shape the first teeth as triangles with regard to a reduction of the noise and with regard to an efficient way to influence the wind flow passing along the wind turbine rotor blade.

Furthermore, it is advantageous that each of the first teeth comprises a base, which is connected with the trailing edge section, a first flank and a second flank. The base and the two flanks build the three sides of the triangularly shaped first tooth.

In other words, it is advantageous that the base of the teeth is facing the wind turbine rotor blade and the tip or vertex of the triangularly shaped tooth is facing to the opposite direction. It may be advantageous to connect the first teeth directly to the trailing edge.

In another advantageous embodiment the first teeth are shaped as substantially isosceles triangles.

This means that both flanks are equal with regard to their length. Exemplarily, the first teeth are shaped as substantially equilateral triangles, i.e. triangles wherein all three sides are equal regarding their length. Thus, the ratio between a base length and a tooth height is approximately 0.9.

However, it may also be advantageous to choose a first teeth where the ratio between the base length and the tooth height is smaller than 0.9. Particularly beneficial for the reduction of noise might be a ratio between the base length and the tooth height in a range between 0.4 and 0.6.

In another advantageous embodiment, the first flank and/or the second flank are serrated and/or are curved, in particular convexly curved.

An advantage of a serrated flank of a tooth is that the acoustic scattering of the turbulence passing the teeth edges is less efficient, thus reducing the noise. A tooth advantageously comprises between one and ten serrations on its flank.

A tooth with a convexly curved flank is also descriptively referred to as a feathered-shaped tooth. A convexly curved flank is well suited to reduce the efficiency of the acoustic scattering of turbulence passing the teeth edges. This again may reduce the noise. Curving the flank and adding serrations to the flank may also be combined.

In another advantageous embodiment, the noise reduction device comprises bumps which are located at the pressure side and/or the suction side. The bumps are located upstream with regard to a wind flow which is flowing from the leading edge section to the trailing edge section. Furthermore, the bumps are arranged and prepared such that the wind flow is selectively guided to the first teeth or to the second teeth by the bumps.

The bumps may also be referred to as hills or ridges. Advantageously, the bumps are located at the trailing edge section. It is advantageous to place bumps upstream of every first tooth such that, for instance, the wind flow is explicitly guided to every second tooth. Bumps may be added to both, the pressure side and the suction side of the wind turbine rotor blade. However, it may also be advantageous to place bumps only on one of the two sides.

In another advantageous embodiment, each of the first teeth is inclined with regard to a trailing edge streamline by a first angle of inclination. Each of the second teeth is inclined with regard to a trailing edge streamline by a second angle of inclination. The first angle of inclination and the second angle of inclination differ from each other by more than one degree, in particular by more than three degrees.

A relatively easy way to reduce both suction side noise and pressure side noise is to choose the design of the first teeth and of the second teeth such that both groups of teeth have the same shape but differ in its angle of inclination with regard to the trailing edge streamline. In this context, the trailing edge streamline refers to the direction of the wind flow when passing along the trailing edge. In other words, the trailing edge streamline refers to the direction of the wind flow at the point where the first fraction, which is flowing along the pressure side, and the second fraction, which is flowing along the suction side, meet again at the trailing edge.

By bending or inclining the teeth with different angles of inclination with regard to the trailing edge streamline the impact on noise reduction can efficiently be tuned and influenced. Advantageously, the angles of inclination are chosen such that a lift coefficient of the wind turbine rotor blade is not adversely influenced, at least not to a significant extent.

It should be noted that the inventive idea may also be transferred and applied to other applications where trailing edge noise exists, e.g. aircraft wings or ventilation fans.

The invention also relates to a method to reduce noise of a wind turbine rotor blade, while the wind turbine rotor blade comprises a root end, a tip end, a leading edge section and a trailing edge section. Noise, which is generated from the wind turbine rotor blade, is reduced by a noise reduction device, which is attached to the trailing edge section as a serrated extension. The noise is reduced by teeth, forming part of the serrated extension. The teeth of the serrated extension are designed as a number of first teeth and as a number of second teeth. The design of the first teeth and the design of the second teeth differ compared to each other, thus suction side noise, which is generated at a suction side of the wind turbine rotor blade, and pressure side noise, which is generated at a pressure side of the wind turbine rotor blade, are both reduced by the teeth of the serrated extension.

Thus, the noise, which is generated from the wind turbine rotor blade, is reduced by the beneficial design of the first teeth and the beneficial second teeth, wherein the design of the first teeth and the design of the second teeth differ from each other such that different aspects of the noise are efficiently addressed. It shall be noted that advantageous embodiments of the arrangement to reduce noise of a wind turbine rotor blade, which have been described above, may also be advantageously used for the described method.

Advantageously, the method is characterized in that the serrated extension is attached to the wind turbine rotor blade as a retrofit or as an integrated part during the manufacturing process of the wind turbine rotor blade.

BRIEF DESCRIPTION OF THE DRAWINGS

Embodiments of the invention are now described, by way of example only, with reference to the accompanying drawings, of which:

FIG. 8 shows a first tooth with convexly curved flanks in a plan view; and

FIG. 9 shows a serrated extension attached to a trailing edge section upon which bumps/ridges are attached in a plan view.

The illustration of the drawings is schematical. Elements which refer to the same function are referred to by the same reference numerals in the drawings, if not stated other.

DESCRIPTION OF THE DRAWINGS

Figure 1:
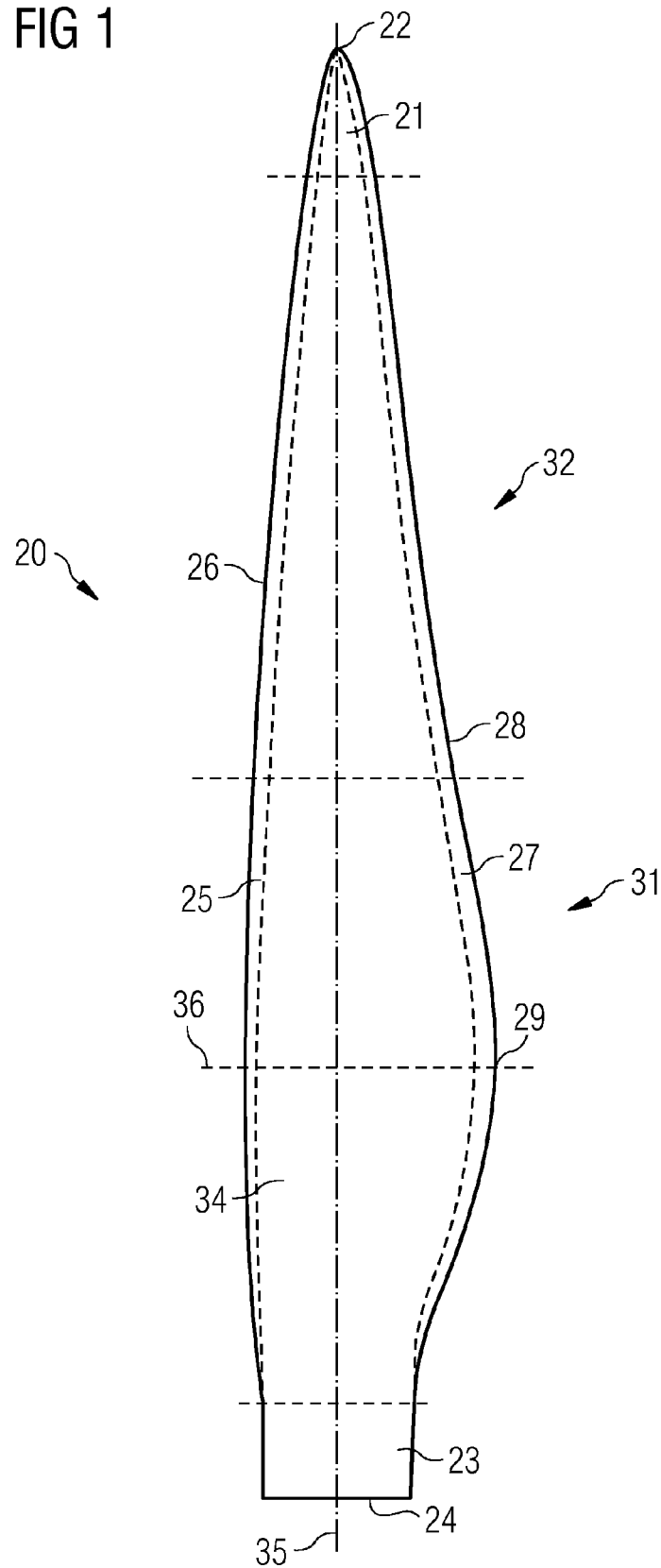
FIG. 1 shows a wind turbine rotor blade according to the state of the art in a plan view.

FIG. 1 shows a wind turbine rotor blade 20 in a plan view, i.e. a top view. The wind turbine rotor blade 20 comprises a tip end 21 and a root end 23. The tip end 21 is referred to as the portion of the wind turbine rotor blade 20 which is around a tip 22 of the wind turbine rotor blade 20. In particular, the volume of the tip end 21 comprises at the most a portion of 10 percent of the volume of the whole wind turbine rotor blade 20. Likewise, the root end 23 is referred to as the portion of the wind turbine rotor blade 20 which is around a root 24 of the wind turbine rotor blade 20. In particular, the volume of the root end 23 comprises at the most 10 percent of the volume of the whole wind turbine rotor blade 20.

Furthermore, the wind turbine rotor blade 20 comprises a leading edge section 25 with a leading edge 26, as well as a trailing edge section 27 with a trailing edge 28. Again, the leading edge section 25 is referred to as the portion of the wind turbine rotor blade 20 which is surrounding the leading edge 26. Likewise, the trailing edge section 27 is referred to as the portion of the wind turbine rotor blade 20 which is surrounding the trailing edge 28.

A chord 36 of the wind turbine rotor blade 20 is an imaginary line between the leading edge 26 and the trailing edge 28. The point of the trailing edge 28 where the respective chord 36 is maximum is denoted as shoulder 29 of the wind turbine rotor blade 20.

A span 35, which is also denoted as a longitudinal axis of the wind turbine rotor blade 20, extends from the tip 22 to the root 24. The chord 36 is defined to be perpendicular to the span 35.

Finally, the wind turbine rotor blade 20 can be divided into an inboard part 31 and an outboard part 32. The inboard part is referred to as the spanwise half of the wind turbine rotor blade 20 which is adjacent to the root 24; the outboard part 32 is referred to as the spanwise half which is adjacent to the tip 22.

Figure 2:
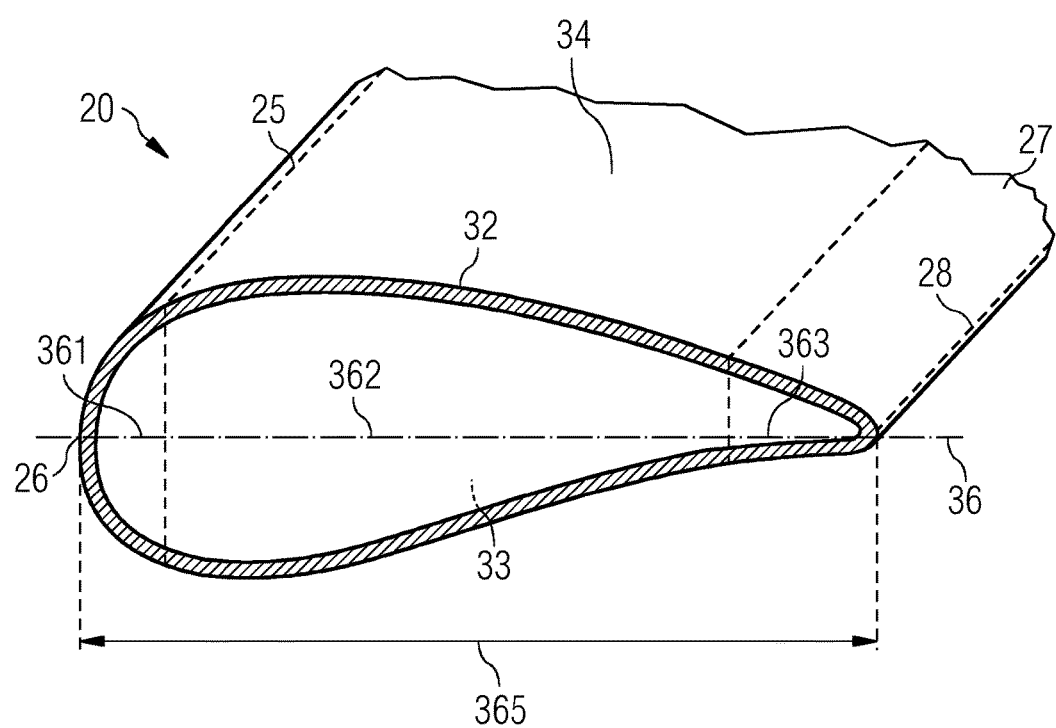
FIG. 2 shows a wind turbine rotor blade according to the state of the art in a perspective view.

FIG. 2 shows a perspective view of a part of a wind turbine rotor blade 20. The wind turbine rotor blade 20 comprises a suction side 34 and, opposite to the suction side 34, a pressure side 33. The chord 36 is divided into three parts: a first part 361, a second part 362, and a third part 363. The first part 361 comprises 10 percent of the chord length 365, the second part 362 comprises 70 percent of the chord length 365 and the third part 363 comprises 20 percent of the chord length 365. Thus, the leading edge section 25 comprises a chordwise portion of 10 percent of the wind turbine rotor blade 20, and the trailing edge section 27 comprises a 20 percent chordwise portion of the wind turbine rotor blade 20.

Figure 3:
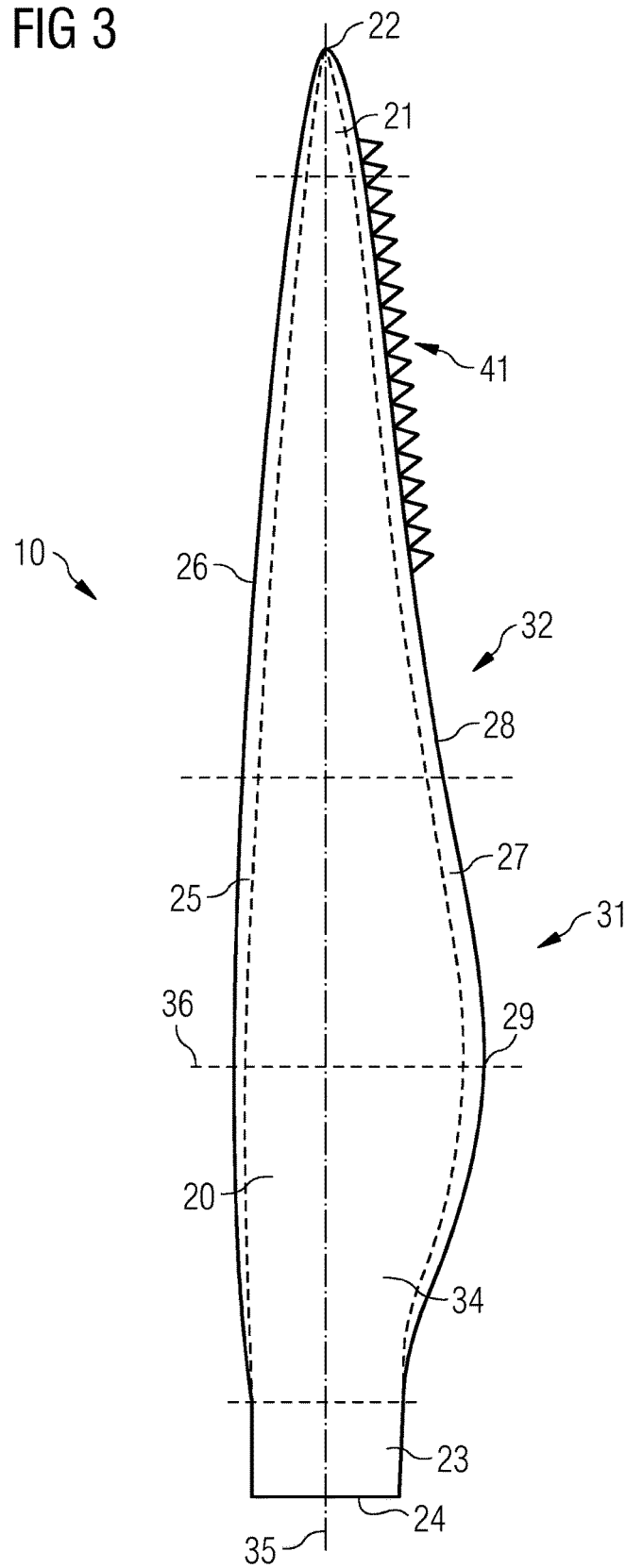
FIG. 3 shows an arrangement comprising a wind turbine rotor blade and a serrated extension in a plan view.

FIG. 3 shows an exemplary arrangement 10 of the invention in a plan view. The arrangement 10 comprises a wind turbine rotor blade 20 and a serrated extension 41. The serrated extension 41 is attached to a trailing edge 28 in an outboard part 32 of the wind turbine rotor blade 20. The serrated extension 41 comprises a plurality of teeth. More specifically, the teeth of the serrated extension 41 are divided into first teeth 61 and second teeth 62. The first teeth 61 and the second teeth 62 are designed slightly differently, which for sake of simplicity is not shown in FIG. 3.

Figure 4:
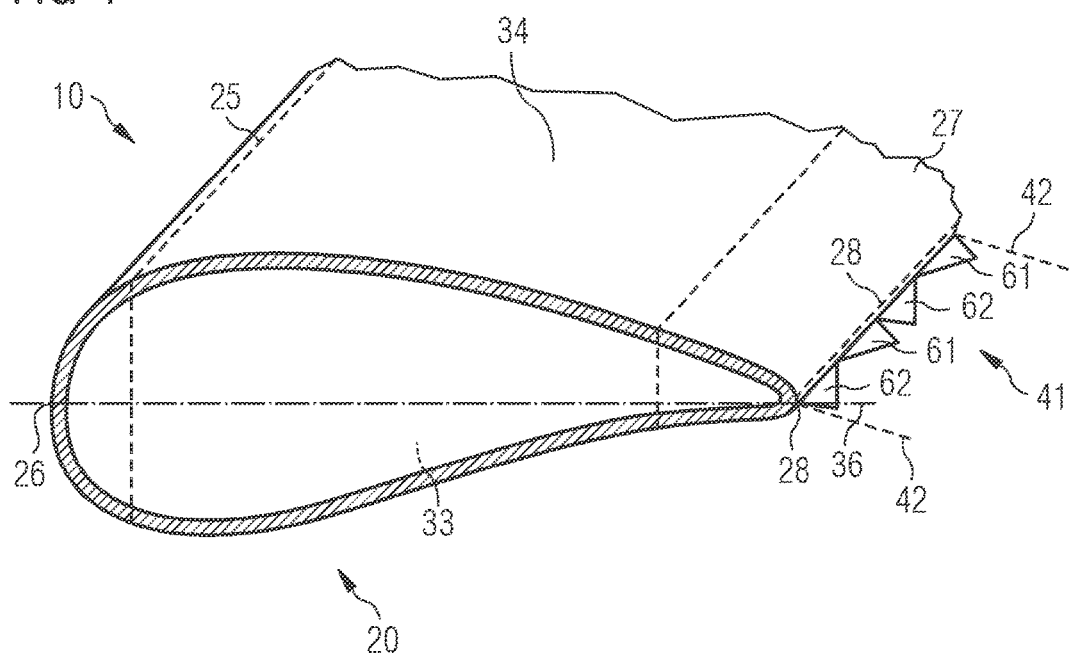
FIG. 4 shows an arrangement comprising a wind turbine rotor blade and a serrated extension with alternating teeth in a perspective view.

FIG. 4 shows a part of an arrangement 10 according to the invention comprising a wind turbine rotor blade 20 and a serrated extension 41 comprising first teeth 61 and second teeth 62. The teeth 61, 62 are attached to the trailing edge section 27 along a trailing edge 28. The first teeth 61 and the second teeth 62 differ from each other in that they are inclined or bent differently with regard to a trailing edge streamline 42. The trailing edge streamline 42 is defined as the direction of a streamline of a wind flow at the trailing edge 28. In FIG. 4, the second teeth 62 are bent more towards a suction side 34 of the wind turbine rotor blade 20 compared to the first teeth 61. The shape of the first teeth 61 and the second teeth 62 is approximately the same.

Figure 5:
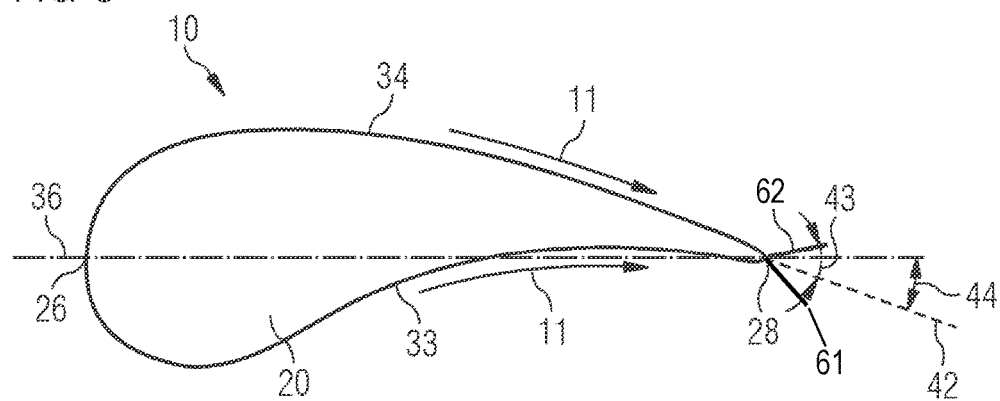
FIG. 5 shows a cross section of a wind turbine rotor blade with a first tooth.

FIG. 5 shows a cross-sectional view of a similar arrangement 10 as shown in FIG. 4. It can be seen that a wind flow 11 flows at the trailing edge 28 in a direction which is referred to as a trailing edge streamline 42.

The trailing edge streamline 42 is inclined with regard to a chord 36 by a trailing edge streamline angle of inclination 44. In FIG. 5 also a cross-sectional view of a first tooth 61 can be seen. The first tooth 61 is attached to the wind turbine rotor blade 20 at a trailing edge 28 of the wind turbine rotor blade 20. The first tooth 61 is inclined or bent with regard to the trailing edge streamline 42 by an angle of inclination 43. Advantageously, the angle of inclination is in a range between 0 degree and 45 degrees (towards either the pressure side of the suction side). Experiments have shown that an angle of inclination 43 in a range between 2 degrees and 15 degrees (towards pressure side or suction side) is particularly beneficial for the reduction of noise, which is generated at a trailing edge section 27 of the wind turbine rotor blade 20.

In a particularly advantageous embodiment, the first teeth 61 comprise an angle of inclination of 5 degrees towards a pressure side 33 of the wind turbine rotor blade 20. Additionally, the second teeth 62 comprise an angle of inclination of 5 degrees towards a suction side 34 of the wind turbine rotor blade 20.

Figure 6:
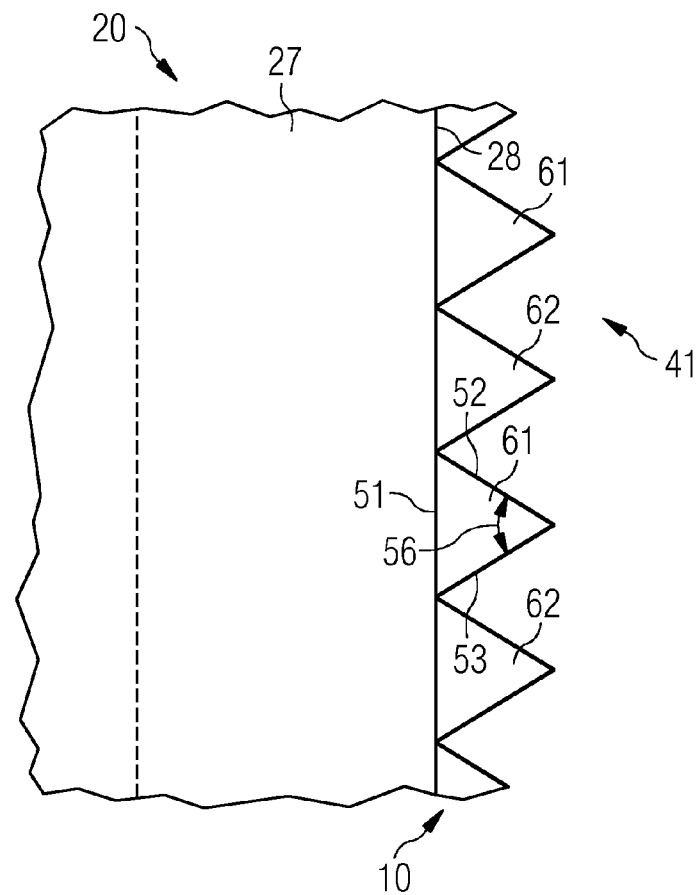
FIG. 6 shows a serrated extension attached to a trailing edge in a plan view.

FIG. 6 shows a plan view of a serrated extension 41, which is attached to a trailing edge 28 of a trailing edge section 27 of a wind turbine rotor blade 20. The serrated extension 41 comprises first teeth 61 and second teeth 62. Both teeth 61, 62 are arranged in an alternating, periodic pattern.

A base 51, a first flank 52, a second flank 53 and a vertex angle 56 can be assigned to the first tooth 61. In the example shown in FIG. 6, the first tooth 61 has the shape of an isosceles triangle. The vertex angle 56 is relatively blunt, approximately comprising 55 degrees in the example shown in FIG. 6.

Figure 7:
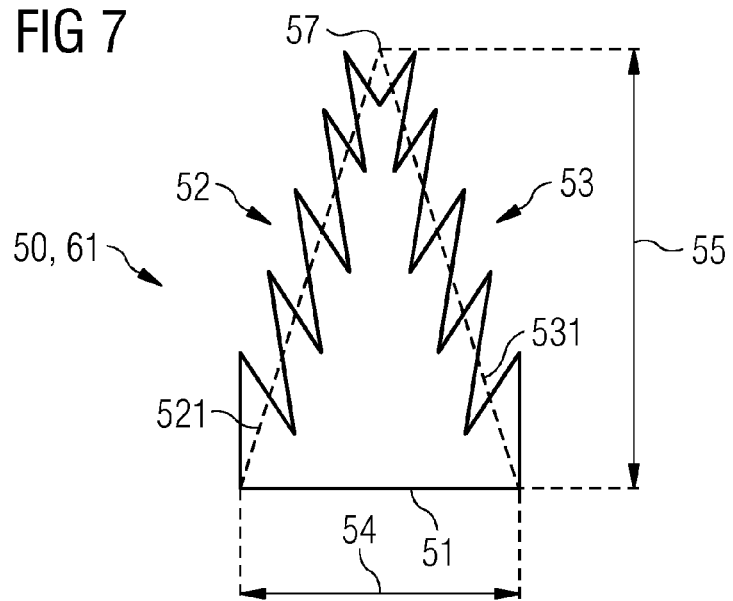
FIG. 7 shows a first tooth with serrated flanks in a plan view.

FIG. 7 and FIG. 8 show two advantageous embodiments of a tooth 50. Both teeth 50 have a shape which can be described as substantially triangular. An ideal triangular shape 57 is depicted with dashed lines.

Deviating from the shape of an ideal triangle 57, FIG. 7 shows a tooth 50 with a serrated first flank 52 and a mirror-symmetrical serrated second flank 53. By reference and comparison, imaginary non-serrated flanks are indicated by the dashed lines 521 and 531. In FIG. 7 it can be seen that a base length 54 of the base 51 as well as a tooth height 55 can be assigned to the tooth 50. Exemplarily, the tooth height 55 is 6 cm and the base length 54 is 4 cm. Additionally, a thickness of the tooth 50 is 2 mm at the base 51. The serrated flanks 52, 53 have the advantage that the acoustic scattering of the turbulence passing the teeth edges is less efficient. This leads to a noise reduction.

In FIG. 8, the first flank 52 and the second flank 53 are convexly curved with regard to an imaginary first flank 521 and an imaginary second flank 531 of an ideal isosceles triangle. This also leads to a less efficient scattering of the turbulence passing the teeth edges, ultimately leading to reduction of noise generated by the wind flow. The shape of the tooth 50 shown in FIG. 8 is also described as a feather-shape.

As already mentioned, the illustration of the drawings is schematical. In particular, the shape of the teeth, and even more particularly, the ratio between the base length 54 and the tooth height 55, shown FIG. 7 and FIG. 8 are not necessarily true to scale. Advantageously, the ratio between the base length 54 and the tooth height 55 is in the range of 0.4 to 0.6.

Finally, FIG. 9 shows bumps or ridges 45 which are attached to a trailing edge section 27 of a wind turbine rotor blade 20. The bumps 45 lead to a deflection of a trailing edge streamline 42 of a wind flow. This has the advantage that wind flows over the teeth 61, 62 of a serrated extension 41 in a different angle compared to a plane trailing edge section 27 without bumps 45. Due to the fact that the deflected or diverted wind flow is more aligned with the flanks of the second teeth 62 noise is reduced. It has to be noted that one of the aspects of the bumps 45 is that the wind flow is selectively guided to the second teeth 62 and prevented of flowing to the first teeth 61.

The invention claimed is:

1. An arrangement to reduce noise of a wind turbine rotor blade, wherein the arrangement comprises
the wind turbine rotor blade and a noise reduction device,
the wind turbine rotor blade comprises a root end, a tip end, a leading edge section comprising a leading edge, and a trailing edge section comprising a trailing edge, the noise reduction device comprises a serrated extension for at least reducing noise which is generated from the wind turbine rotor blade, and the noise reduction device is attached to the trailing edge section, wherein the serrated extension comprises a number of first teeth and a number of second teeth, wherein the first teeth and the second teeth each comprises a respective base, and the bases of the first teeth and of the second teeth are arranged end to end to form a single row comprising the first teeth and the second teeth along the trailing edge in a spanwise direction, and wherein a design of the first teeth and the design of the second teeth are different compared to each other such that suction side noise, which is generated at a suction side of the wind turbine rotor blade, and pressure side noise, which is generated at a pressure side of the wind turbine rotor blade, are both reduced by the first teeth and the second teeth of the serrated extension.

2. The arrangement according to claim 1, wherein the first teeth and the second teeth are arranged in an alternating, periodic pattern.

3. The arrangement according to claim 1, wherein the number of first teeth is differing by less than 2 with regard to the number of second teeth.

4. The arrangement according to claim 1, wherein the trailing edge section is limited to a twenty percent chordwise portion of the wind turbine rotor blade beginning at the trailing edge and moving toward the leading edge, the noise reduction device comprises bumps which are located in the trailing edge section at the pressure side and/or the suction side, the bumps are located upstream with regard to a wind flow which is flowing from the leading edge section to the trailing edge section, and the bumps and/or ridges are arranged and prepared such that the wind flow is selectively guided to the first teeth or to the second teeth by the bumps.

5. The arrangement according to claim 4, wherein each bump is disposed upstream of a respective first tooth and is configured to deflect airflow to respective second teeth positioned immediately adjacent the respective first tooth while blocking airflow to the respective first tooth.

6. The arrangement according to claim 1, wherein each of the first teeth is inclined with regard to a trailing edge streamline by a first angle of inclination, each of the second teeth is inclined with regard to the trailing edge streamline by a second angle of inclination, and the first angle of inclination and the second angle of inclination differ from each other by more than 1 degree.

7. The arrangement according to claim 6, wherein the first angle of inclination and the second angle of inclination differ from each other by more than 3 degrees.

8. The arrangement according to claim 1, wherein the first teeth are substantially triangularly shaped.

9. The arrangement according to claim 8, wherein each of the first teeth comprises a first flank and a second flank, and the base and the first and second flanks build three sides of the triangularly shaped first tooth.

10. The arrangement according to claim 9, wherein the first teeth are shaped as substantially isosceles triangles.

11. The arrangement according to claim 9, wherein the first flank and/or the second flank comprises triangular serrations.

12. The arrangement according to claim 11, wherein the first flank and/or the second flank are convexly curved.

13. A method to reduce noise of a wind turbine rotor blade, wherein the wind turbine rotor blade comprises a root end, a tip end, a leading edge section and a trailing edge section comprising a trailing edge, the method comprising:

reducing noise, which is generated from the wind turbine rotor blade, by a noise reduction device, which is attached to the trailing edge section as a serrated extension, wherein the noise is reduced by teeth, forming part of the serrated extension, wherein the teeth of the serrated extension are designed as a number of first teeth and as a number of second teeth, wherein the first teeth and the second teeth each comprises a respective base, and the bases of the first teeth and of the second teeth are arranged end to end to form a single row comprising the first teeth and the second teeth along the trailing edge in a spanwise direction, and wherein a design of the first teeth and the design of the second teeth differ compared to each other, thus suction side noise, which is generated at a suction side of the wind turbine rotor blade, and pressure side noise, which is generated at a pressure side of the wind turbine rotor blade, are both reduced by the first teeth and the second teeth of the serrated extension.

14. The method according to claim 13, wherein the serrated extension is attached to the wind turbine rotor blade as a retrofit or as an integrated part during a manufacturing process of the wind turbine rotor blade.

* * * * *